(12) United States Patent
Ogasawara

(10) Patent No.: US 11,372,374 B2
(45) Date of Patent: Jun. 28, 2022

(54) TIMEPIECE MOVEMENT, TIMEPIECE, AND REFERENCE POSITION DETERMINATION METHOD OF INDICATING HAND OF TIMEPIECE

(71) Applicant: Seiko Instruments Inc., Chiba (JP)

(72) Inventor: Kenji Ogasawara, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 924 days.

(21) Appl. No.: 16/164,134

(22) Filed: Oct. 18, 2018

(65) Prior Publication Data

US 2019/0121296 A1    Apr. 25, 2019

(30) Foreign Application Priority Data

Oct. 20, 2017  (JP) .............................. JP2017-203157
Jul. 12, 2018  (JP) .............................. JP2018-132227

(51) Int. Cl.
*G04C 3/14*      (2006.01)
*H02P 8/34*      (2006.01)
*H02P 8/02*      (2006.01)

(52) U.S. Cl.
CPC .............. *G04C 3/14* (2013.01); *G04C 3/143* (2013.01); *H02P 8/02* (2013.01); *H02P 8/34* (2013.01)

(58) Field of Classification Search
CPC ...... H02P 8/00; H02P 8/02; H02P 8/04; H02P 8/06; H02P 8/08; H02P 8/14; H02P 8/22; H02P 8/24; H02P 8/30; H02P 6/00; H02P 6/04; H02P 6/22; H02P 6/24; H02P 7/00; H02P 7/03; H02P 7/28; H02P 7/29; H02P 3/00; H02P 3/025; H02P 1/00; H02P 1/04; H02P 1/18; H02P 1/22; H02P 1/24; H02P 1/40; H02P 1/46; H02P 1/465
See application file for complete search history.

(56) References Cited

U.S. PATENT DOCUMENTS 8,251,575 B2 *    8/2012   Sato .................. G04C 3/143
                                                       368/200
8,319,468 B2     11/2012   Manaka et al.
2011/0235472 A1   9/2011   Hasegawa

FOREIGN PATENT DOCUMENTS

| JP | 2000-321376 | 11/2000 |
|----|-------------|---------|
| JP | 3 625395 B2 | 3/2005  |
| JP | 3625395     | 3/2005  |
| JP | 5 363167 B2 | 12/2013 |
| JP | 5363167     | 12/2013 |

OTHER PUBLICATIONS

Extended European Search Report dated Apr. 17, 2019 for European Application No. 18201483.7, 8 pages.

* cited by examiner

*Primary Examiner* — Antony M Paul
(74) *Attorney, Agent, or Firm* — Crowell & Moring LLP

(57) ABSTRACT

A timepiece movement includes a stepping motor having a rotor for rotating an indicating hand, and a control unit for rotating the rotor by using a main drive pulse and an auxiliary drive pulse. When the indicating hand is rotated using a detection drive pulse based on the main drive pulse, the control unit determines a reference position of the indicating hand by detecting a rotation state of the rotor.

12 Claims, 10 Drawing Sheets

TIMEPIECE MOVEMENT, TIMEPIECE, AND REFERENCE POSITION DETERMINATION METHOD OF INDICATING HAND OF TIMEPIECE

RELATED APPLICATIONS

This application claims priority under 35 U.S.C. § 119 to Japanese Patent Application Nos. 2017-203157 filed on Oct. 20, 2017 and 2018-132227 filed Jul. 12, 2018, the entire content of which are hereby incorporated by reference.

BACKGROUND OF THE INVENTION

1. Field of the Invention

The present invention relates to a timepiece movement, a timepiece, and a reference position determination method of an indicating hand of a timepiece.

2. Description of the Related Art

In a timepiece, as a method of detecting a position of an indicating hand, the following method is known, for example. A hole belonging to a gear configuring a train wheel is interposed between a light emitting element and a light receiving element so as to detect the position by determining the presence or absence of transmitted light.

A rotation state detection technique (for example, refer to Japanese Patent No. 5363167) has been proposed in which the indicating hand of the timepiece is driven using a drive pulse used for normal driving so as to detect a rotation state of the indicating hand by using an induced voltage. According to the invention disclosed in Japanese Patent No. 5363167, in a case where the position is detected as a non-rotation state by using the detection method, an indicating hand operation is realized using an auxiliary drive pulse so as to add a rotational force to the indicating hand operation.

Furthermore, the following technique (Japanese Patent No. 3625395) has been proposed. In a case where a control unit of the timepiece detects a predetermined high load corresponding to a reference position of the indicating hand, the control unit determines a position where the high load is detected as the reference position. According to the invention disclosed in Japanese Patent No. 3625395, the control unit identifies the reference position in response to a state where the auxiliary drive pulse is output.

However, in the related art disclosed in Japanese Patent No. 3625395, if there is no load sufficient for outputting the auxiliary drive pulse in a case of detecting the non-rotation state, it is difficult to identify the reference position. In a case of using the auxiliary drive pulse, power consumption required for driving the timepiece increases.

SUMMARY OF THE INVENTION

It is an aspect of the present application to provide a timepiece movement, a timepiece, and a reference position determination method of an indicating hand of a timepiece, in which means for grasping a reference position of an indicating hand can be realized using a predetermined load for enabling a normal hand operation.

According to the aspect of the present application, in order to achieve the above-described object, there is provided a timepiece movement including a stepping motor having a rotor for rotating an indicating hand, and a control unit for rotating the rotor by using a main drive pulse and an auxiliary drive pulse. When the indicating hand is rotated using a detection drive pulse based on the main drive pulse, the control unit determines a reference position of the indicating hand by detecting a rotation state of the rotor.

The timepiece movement according to the aspect of the present application may further include a reference load unit disposed at a predetermined position in a drive mechanism including the indicating hand and the rotor so as to apply a fluctuation to a load received by the rotor when the indicating hand is located at the reference position. The control unit may detect the rotation state of the rotor by detecting an induced voltage during at least one period in a detection period including a first detection period after the detection drive pulse is output, a second detection period subsequent to the first detection period, and a third detection period subsequent to the second detection period. The control unit may determine the reference position, based on at least two detection results in the first detection period, the second detection period, and the third detection period.

In the timepiece movement according to the aspect of the present application, the control unit may set the detection drive pulse to first energy. The control unit may detect the rotation state of the rotor throughout one round period during which the indicating hand is rotated at least one round. In a case where a load fluctuation applied by the reference load unit is not identified during the one round period, the control unit may set the detection drive pulse to second energy which is lower than the first energy. The control unit may detect the rotation state of the rotor in accordance with the one round period by using the detection drive pulse of the second energy. In a case where the load fluctuation applied by the reference load unit is identified twice or more times during the one round period, the control unit may set the detection drive pulse to third energy which is higher than the first energy. The control unit may detect the rotation state of the rotor throughout the one round period by using the detection drive pulse of the third energy. In a case where the load fluctuation applied by the reference load unit is identified only once during the one round period, the control unit may determine a position where the fluctuation is identified, as the reference position.

In the timepiece movement according to the aspect of the present application, the control unit may detect the rotation state of the rotor throughout the one round period during which the indicating hand is rotated at least one round. In a case where a load fluctuation applied by the reference load unit is not identified during the one round period, or in a case where the load fluctuation applied by the reference load unit is discontinuously identified twice or more times, the control unit may detect the rotation state of the rotor again throughout the one round period without changing energy of the detection drive pulse. In a case where the load fluctuation applied by the reference load unit is identified only once during the one round period, the control unit may determine a position where the fluctuation is identified, as the reference position.

In the timepiece movement according to the aspect of the present application, the control unit may be capable of controlling a case where an indicating hand operation is performed using the detection drive pulse when a first rotation state is detected, and a case where the indicating hand operation is performed by adding the auxiliary drive pulse after the indicating hand operation is performed using the detection drive pulse when a second rotation state is detected. In a case where the second rotation state is detected, the control unit may determine the reference position by identifying the load fluctuation applied by the reference load unit. In a case where the load fluctuation applied by the reference load unit is identified only once in the one round period during which the indicating hand is rotated at least one round, the control unit may determine a position where the fluctuation is identified, as the reference position.

The first rotation state means a state where the indicating hand is operated using the detection drive pulse without using the auxiliary drive pulse. The second rotation state means a state where the indicating hand is operated using the auxiliary drive pulse after the indicating hand is operated using the detection drive pulse.

In the timepiece movement according to the aspect of the present application, when the control unit detects the rotation state of the rotor throughout the one round period during which the indicating hand is rotated at least one round, in a case where the control unit detects an induced voltage based on the reference load unit during the first detection period and the second detection period at one position in the one round period, or in a case where the control unit detects the induced voltage based on the reference load unit during the third detection period without detecting the induced voltage based on the reference load unit during the second detection period, the control unit may determine the position as the reference position.

In the timepiece movement according to the aspect of the present application, in a case where the load fluctuation applied by the reference load unit is continuously detected at least twice in the one round period during which the indicating hand is rotated at least one round, the control unit may determine the reference position, based on first time detection.

In the timepiece movement according to the aspect of the present application, in a case where the load fluctuation applied by the reference load unit is continuously detected at least twice in the one round period during which the indicating hand is rotated at least one round, the control unit may determine a position having a greatest load fluctuation, as the reference position.

In the timepiece movement according to the aspect of the present application, the control unit may store the detection drive pulse used when the reference position is determined, as an optimal pulse.

In the timepiece movement according to the aspect of the present application, the control unit may control the stepping motor so that the indicating hand is operated using the optimal pulse.

According to another aspect of the present application, there is provided a timepiece including any one of the above-described timepiece movements.

According to still another aspect of the present application, there is provided a reference position determination method of an indicating hand of a timepiece including an indicating hand, a stepping motor having a rotor for rotating the indicating hand, and a control unit for rotating the rotor by using a main drive pulse and an auxiliary drive pulse. The method includes a step of causing the control unit to determine a reference position of the indicating hand by detecting a rotation state of the rotor, when the rotor is rotated using a detection drive pulse based on the main drive pulse.

According to the present application, means for grasping the reference position of the indicating hand can be realized using a predetermined load for enabling a normal hand operation.

DETAILED DESCRIPTION OF THE PREFERRED EMBODIMENTS

Figure 1:
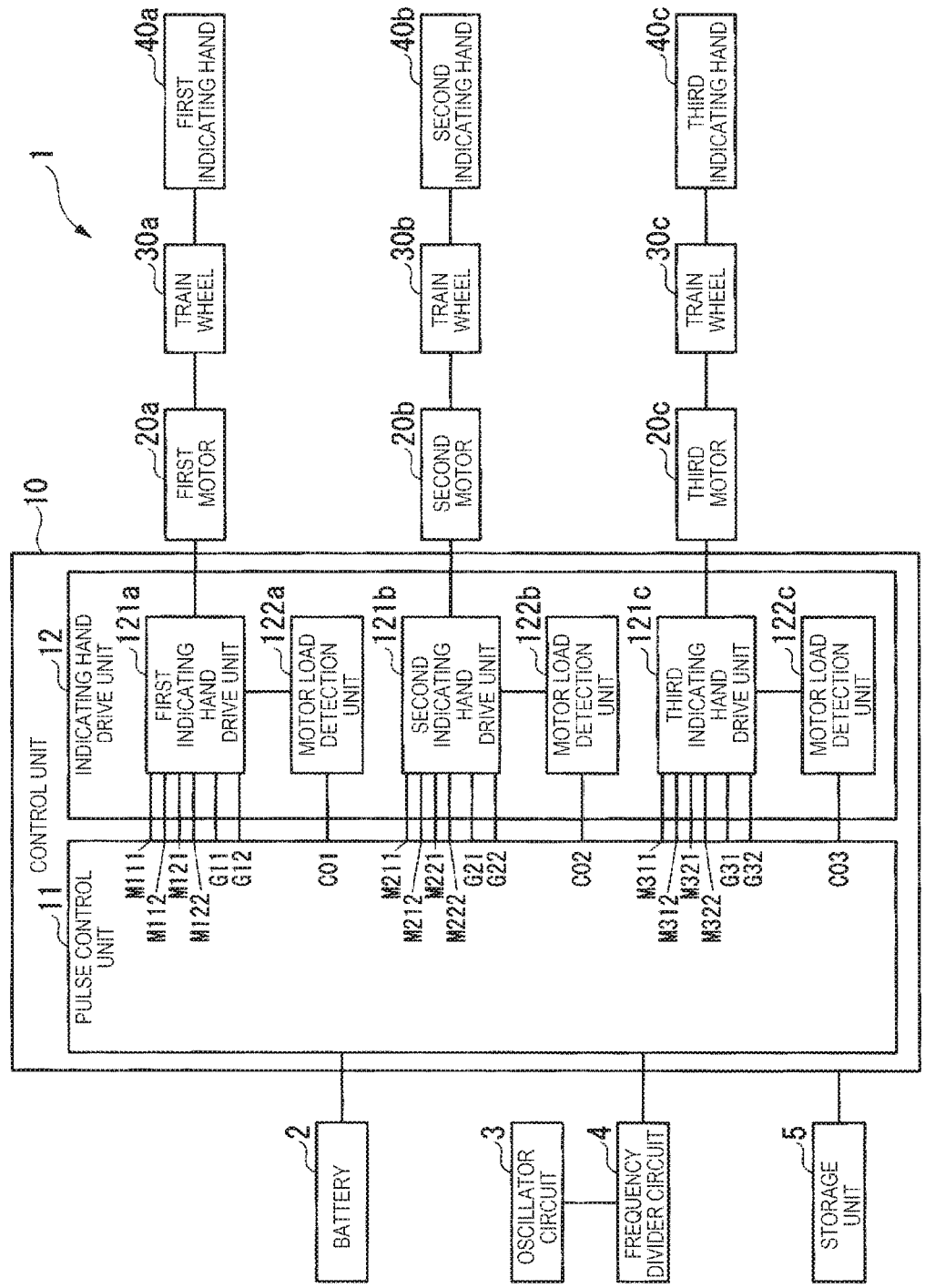
FIG. 1 is a block diagram illustrating a configuration example of a timepiece according to the present embodiment.

Hereinafter, an embodiment according to the present invention will be described with reference to the drawings. In the drawings used in the following description, a scale of each member is appropriately changed in order to enable each member to have a recognizable size.

FIG. 1 is a block diagram illustrating a configuration example of a timepiece 1 according to the present embodiment. The timepiece 1 includes a battery 2, an oscillator circuit 3, a frequency divider circuit 4, a storage unit 5, a control unit 10, a first motor 20a, a second motor 20b, a third motor 20c, a train wheel 30a, a train wheel 30b, a train wheel 30c, a first indicating hand 40a, a second indicating hand 40b, and a third indicating hand 40c.

The control unit 10 includes a pulse control unit 11 and an indicating hand drive unit 12.

The indicating hand drive unit 12 includes a first indicating hand drive unit 121a, a motor load detection unit 122a, a second indicating hand drive unit 121b, a motor load detection unit 122b, a third indicating hand drive unit 121c, and a motor load detection unit 122c.

A timepiece movement includes at least the storage unit 5, the control unit 10, the first motor 20a, the second motor 20b, the third motor 20c, the train wheel 30a, the train wheel 30b, and the train wheel 30c.

In a case where one of the first motor 20a, the second motor 20b, and the third motor 20c is not specified, all of these will be collectively referred to as a motor 20. In a case where one of the train wheel 30a, the train wheel 30b, and the train wheel 30c is not specified, all of these will be collectively referred to as a train wheel 30. In a case where one of the first indicating hand 40a, the second indicating hand 40b, and the third indicating hand 40c is not specified, all of these will be collectively referred to as an indicating hand 40. In a case where one of the first indicating hand drive unit 121a, the second indicating hand drive unit 121b, and the third indicating hand drive unit 121c is not specified, all of these will be collectively referred to as an indicating hand drive unit 121. In a case where one of the motor load detection unit 122a, the motor load detection unit 122b, and the motor load detection unit 122c is not specified, all of these will be collectively referred to as a motor load detection unit 122.

The timepiece 1 illustrated in FIG. 1 is an analog timepiece which displays a measured time by using the indicating hand 40. In the example illustrated in FIG. 1, the timepiece 1 includes three indicating hands 40. However, the number of the indicating hands 40 may be one, two, four, or more. In this case, for each of the indicating hands 40, the timepiece 1 includes the indicating hand drive unit 121, the motor load detection unit 122, the motor 20, and the train wheel 30.

For example, the battery 2 is a lithium battery or a silver oxide battery, which is a so-called button battery. The battery 2 may be a solar battery and a storage battery for storing power generated by the solar battery. The battery 2 supplies the power to the control unit 10.

For example, the oscillator circuit 3 is a passive element used in order to oscillate a predetermined frequency from mechanical resonance thereof by utilizing a piezoelectric phenomenon of a crystal. Here, the predetermined frequency is 32 kHz, for example.

The frequency divider circuit 4 divides a signal having the predetermined frequency output by the oscillator circuit 3 into a desired frequency, and outputs the divided signal to the control unit 10.

The storage unit 5 stores a main drive pulse and an auxiliary drive pulse for each of the first indicating hand 40a, the second indicating hand 40b, and the third indicating hand 40c. The main drive pulse and the auxiliary drive pulse will be described later. The storage unit 5 stores a search pulse for each of the first indicating hand 40a, the second indicating hand 40b, and the third indicating hand 40c. The search pulse is used when a reference position of the indicating hand 40 is detected. The search pulse and detecting the reference position will be described later. The storage unit 5 stores data in association with a combination of an output of a comparator Q7 (refer to FIG. 3) included in the motor load detection unit 122 in sections T1 to T3, a rotation state, and a state of the motor 20. The sections T1 to T3 will be described later with reference to FIG. 7. The storage unit 5 stores a predetermined cycle, a pulse width in a drive pulse (to be described later), the number of pulses in the drive pulse, and the number of changed pulses. The storage unit 5 stores a program used by the control unit 10 for controlling.

The control unit 10 measures the time by using the desired frequency divided by the frequency divider circuit 4, and drives the motor 20 so that the indicating hand 40 is operated in response to a time measurement result. The control unit 10 detects a reverse voltage (induced voltage) generated by the rotation of the motor 20, and detects the reference position of the indicating hand 40, based on a detected result. A detection method of the reference position will be described later.

The pulse control unit 11 measures the time by using the desired frequency divided by the frequency divider circuit 4, generates a pulse signal so as to operate the indicating hand 40 in response to the time measurement result, and outputs the generated pulse signal to the indicating hand drive unit 12. The pulse control unit 11 acquires a comparison result between the induced voltage generated in the motor 20 which is detected by the indicating hand drive unit 12 and a reference voltage. Based on an acquired result, the pulse control unit 11 detects the reference position.

In the pulse control unit 11, a drive terminal M111, a drive terminal M112, a drive terminal M121, a drive terminal M122, a control terminal G11, and a control terminal G12 are connected to the first indicating hand drive unit 121a. A detection terminal CO1 is connected to the motor load detection unit 122a. A drive terminal M211, a drive terminal M212, a drive terminal M221, a drive terminal M222, a control terminal G21, and a control terminal G22 are connected to the second indicating hand drive unit 121b. A detection terminal CO2 is connected to the motor load detection unit 122b. A drive terminal M311, a drive terminal M312, a drive terminal M321, a drive terminal M322, a control terminal G31, and a control terminal G32 are connected to the third indicating hand drive unit 121c. A detection terminal CO3 is connected to the motor load detection unit 122c.

The indicating hand drive unit 12 drives the motor 20 in response to the pulse signal output by the pulse control unit 11, thereby operating the indicating hand 40. The indicating hand drive unit 12 detects the induced voltage generated when the motor 20 is driven, and outputs the comparison result between the detected induced voltage and the reference voltage to the pulse control unit 11.

The first indicating hand drive unit 121a generates the pulse signal for rotating the first motor 20a forward or rearward in accordance with the control of the pulse control unit 11. The first indicating hand drive unit 121a drives the first motor 20a by using the generated pulse signal.

The second indicating hand drive unit 121b generates the pulse signal for rotating the second motor 20b forward or rearward in accordance with the control of the pulse control unit 11. The second indicating hand drive unit 121b drives the second motor 20b by using the generated pulse signal.

The third indicating hand drive unit 121c generates the pulse signal for rotating the third motor 20c forward or rearward in accordance with the control of the pulse control unit 11. The third indicating hand drive unit 121c drives the third motor 20c by using the generated pulse signal.

The motor load detection unit 122a detects the reverse voltage generated in the first indicating hand drive unit 121a by the rotation of the first motor 20a, compares the detected reverse voltage with a reference voltage Vcomp which is a threshold value, and outputs the comparison result to the pulse control unit 11.

The motor load detection unit 122b detects the reverse voltage generated in the second indicating hand drive unit 121b by the rotation of the second motor 20b, compares the detected reverse voltage with the reference voltage Vcomp, and outputs the comparison result to the pulse control unit 11.

The motor load detection unit 122c detects the reverse voltage generated in the third indicating hand drive unit 121c by the rotation of the third motor 20c, compares the detected reverse voltage with the reference voltage Vcomp, and outputs the comparison result to the pulse control unit 11.

The first motor 20a, the second motor 20b, and the third motor 20c are respectively stepping motors, for example. The first motor 20a drives the first indicating hand 40a via the train wheel 30a by using the pulse signal output by the first indicating hand drive unit 121a. The second motor 20b drives the second indicating hand 40b via the train wheel 30b by using the pulse signal output by the second indicating hand drive unit 121b. The third motor 20c drives the third indicating hand 40c via the train wheel 30c by using the pulse signal output by the third indicating hand drive unit 121c.

The train wheel 30a, the train wheel 30b, and the train wheel 30c are respectively configured to include at least one gear. According to the present embodiment, the train wheel 30 is formed as follows. For example, a shape of the gear belonging to the train wheel 30 is processed. In this manner, while the indicating hand 40 is rotated 360 degrees, a load fluctuates at one location. That is, according to the present embodiment, a configuration is adopted as follows. A reference load unit is disposed at a predetermined position in a drive mechanism including the indicating hand 40 and a rotor belonging to the motor 20. When the indicating hand 40 is located at the reference position, a fluctuation is provided for a load received by the rotor.

For example, the first indicating hand 40a is an hour hand. For example, the second indicating hand 40b is a minute hand. For example, the third indicating hand 40c is a second hand. The first indicating hand 40a, the second indicating hand 40b, and the third indicating hand 40c are respectively supported so as to be rotatable by a support body (not illustrated).

Next, the reference load unit and the reference position will be described.

Figure 2:
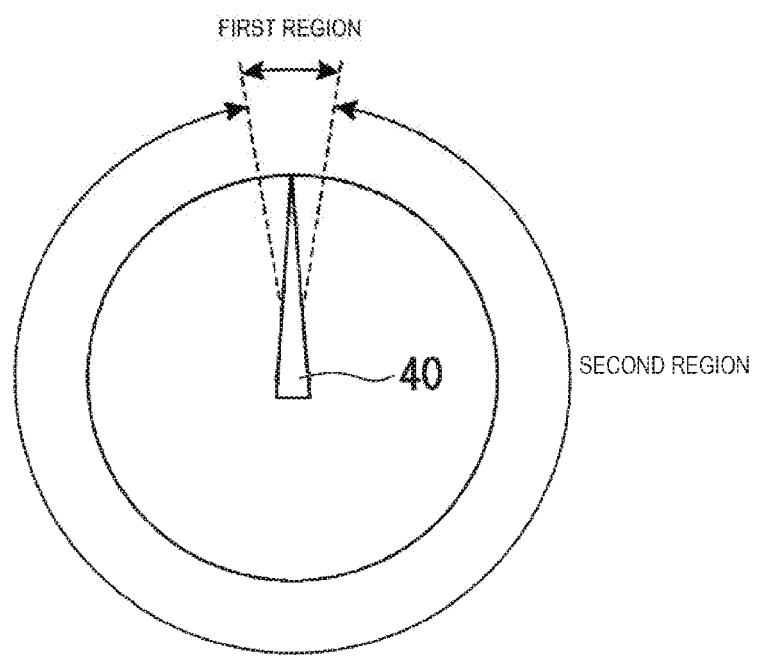
FIG. 2 is a view for describing an example of a reference load unit and a reference position according to the present embodiment.

FIG. 2 is a view for describing an example of the reference load unit and the reference position according to the present embodiment. For example, the indicating hand 40 in FIG. 2 represents the third indicating hand 40c which is the second hand.

In FIG. 2, when a position of approximately 12 o'clock is the reference position and the indicating hand is located at this position (first region), compared to the other position (second region), the load received by the rotor is high. That is, in the example illustrated in FIG. 2, the reference load unit is disposed at the position of approximately 12 o'clock. In other words, the load of the first region which is received by the rotor is higher than the load of the second region. According to the present embodiment, the position where the load received by the rotor increases is detected as the reference position.

FIG. 2 illustrates an example in which the position of approximately 12 o'clock is the reference position. However, the reference position may be the other position. The respective reference positions of the first indicating hand 40a, the second indicating hand 40b, and the third indicating hand 40c may be the same position or mutually different positions.

Next, a configuration example of the indicating hand drive unit 121 and the motor load detection unit 122 will be described.

Figure 3:
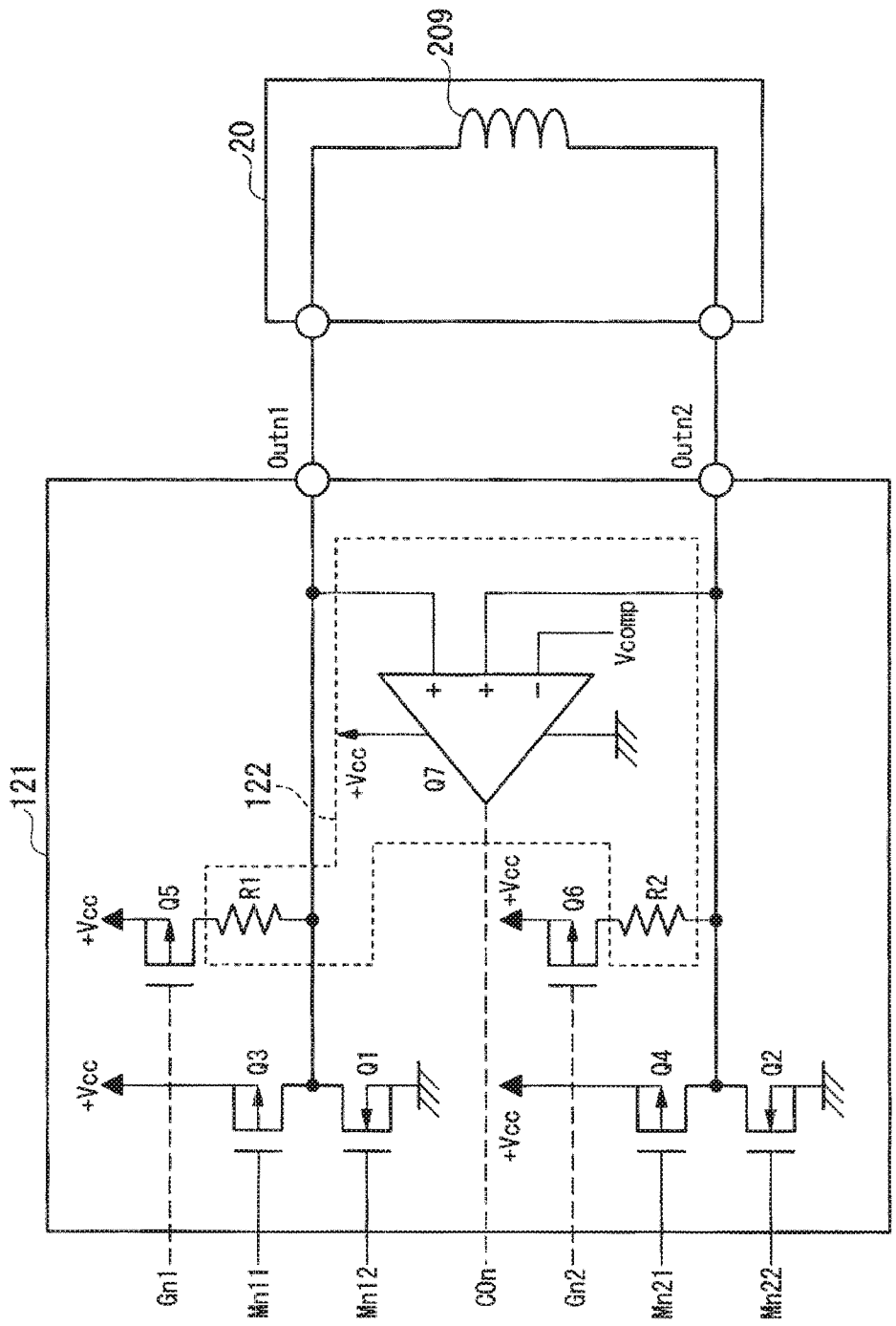
FIG. 3 is a block diagram illustrating a configuration example of an indicating hand drive unit and a motor load detection unit according to the present embodiment.

FIG. 3 is a block diagram illustrating the configuration example of the indicating hand drive unit 121 and the motor load detection unit 122 according to the present embodiment.

As illustrated in FIG. 3, the indicating hand drive unit 121 includes switching elements Q1 to Q6. The motor load detection unit 122 includes resistors R1 and R2 and the comparator Q7.

In the switching element Q3, a gate is connected to a drive terminal Mn11 (n is any one of 1 to 3) of the pulse control unit 11, a source is connected to a power source +Vcc, and a drain is connected to a drain of the switching element Q1, one end of the resistor R1, a first input portion (+) of the comparator Q7, and a first output terminal Outn1.

In the switching element Q1, a gate is connected to a drive terminal Mn12 of the pulse control unit 11, and a source is grounded.

In the switching element Q5, a gate is connected to a control terminal Gn1 of the pulse control unit 11, a source is connected to the power source +Vcc, and a drain is connected to the other end of the resistor R1.

In the switching element Q4, a gate is connected to a drive terminal Mn21 of the pulse control unit 11, a source is connected to the power source +Vcc, and a drain is connected to a drain of the switching element Q2, one end of the resistor R2, a second input portion (+) of the comparator Q7, and a second output terminal Outn2.

In the switching element Q2, a gate is connected to a drive terminal Mn22 of the pulse control unit 11, and a source is grounded.

In the switching element Q6, a gate is connected to a control terminal Gn2 of the pulse control unit 11, a source is connected to the power source +Vcc, and a drain is connected to the other end of the resistor R2.

In the comparator Q7, the reference voltage Vcomp is supplied to a third input portion (−), and an output portion is connected to a detection terminal COn of the pulse control unit 11.

The motor 20 is connected to both ends of the first output terminal Outn1 and the second output terminal Outn2 of the indicating hand drive unit 121.

For example, each of the switching elements Q3, Q4, Q5, and Q6 is a P-channel field effect transistor (FET). For example, each of the switching elements Q1 and Q2 is an N-channel FET.

The switching elements Q1 and Q2 are configuration elements for driving the motor 20. The switching elements Q5 and Q6, and the resistor R1 and the resistor R2 are configuration elements for detecting the rotation. The switching elements Q3 and Q4 are configuration elements used for both driving the motor 20 and detecting the rotation of the motor 20. The switching elements Q1 to Q6 are respectively low impedance elements having low ON-resistance in an ON-state. Resistance values of the resistors R1 and R2 are the same as each other, and are greater than a value of the ON-resistance of the switching element.

The indicating hand drive unit 121 brings the switching elements Q1 and Q4 into an ON-state at the same time, and brings the switching elements Q2 and Q3 into an OFF-state at the same time. In this manner, the indicating hand drive unit 121 supplies an electric current flowing in a forward direction to a drive coil 209 included in the motor 20, thereby rotationally driving the motor 20 by 180 degrees in the forward direction. The indicating hand drive unit 121 brings the switching elements Q2 and Q3 into the ON-state at the same time, and brings the switching elements Q1 and Q4 into the OFF-state at the same time. In this manner, the indicating hand drive unit 121 supplies the electric current flowing in a rearward direction to the drive coil 209, thereby rotationally driving the motor 20 by further 180 degrees in the forward direction.

Next, an example of the drive signal output by the pulse control unit 11 will be described.

Figure 4:
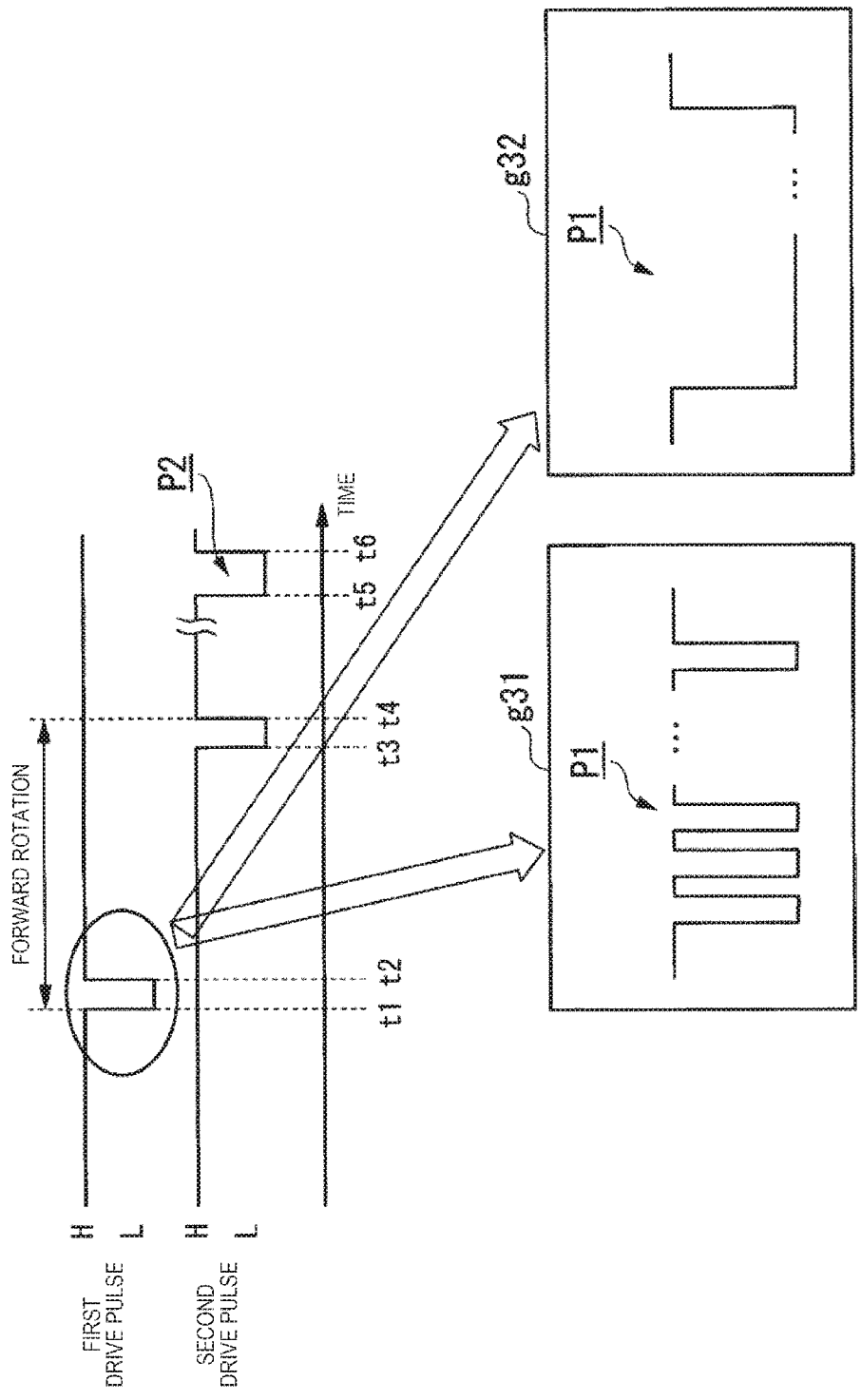
FIG. 4 illustrates an example of a drive pulse output by a pulse control unit according to the present embodiment.

FIG. 4 illustrates an example of the drive pulse output by the pulse control unit 11 according to the present embodiment. In FIG. 4, a horizontal axis represents a time, and a vertical axis represents whether the signal is in an H (high) level or in an L (low) level. A waveform P1 is a waveform of a first drive pulse. A waveform P2 is a waveform of a second drive pulse.

During a period of times t1 to t6, the motor 20 is rotated forward. During a period of times t1 to t2, the pulse control unit 11 generates a first drive pulse Mn1. During a period of times t3 to t4, the pulse control unit 11 generates a second drive pulse Mn2. The drive signal generated during the period of times t1 to t2 or the period of times t3 to t4 is configured to include a plurality of pulse signals as in a region indicated by a reference numeral g31, and the pulse control unit 11 adjusts a pulse duty. In this case, the period of times t1 to t2 or the period of times t3 to t4 is changed in accordance with the pulse duty. Hereinafter, in the present embodiment, a signal wave of the region indicated by the reference numeral g31 will be referred to as a "comb tooth wave". The drive signal generated during the period of times t1 to t2 or the period of times t3 to t4 is configured to include one pulse signal as in the region indicated by a reference numeral g32, and the pulse control unit 11 adjusts a pulse width. In this case, the period of times t1 to t2 or the period of times t3 to t4 is changed in accordance with the pulse width. Hereinafter, in the present embodiment, a signal wave of the region indicated by the reference numeral g32 will be referred to as a "rectangular wave".

In the present embodiment, a pulse generated during the period of times t1 to t2 or the period of times t3 to t4 will be referred to as a main drive pulse P1. In the following description, an example will be described in which the main drive pulse P1 is the comb tooth wave.

An auxiliary drive pulse P2 generated during a period of times t5 to t6 is a drive pulse to be output only when it is detected that the rotor is not rotated by the main drive pulse P1.

In the embodiment, a state where the indicating hand 40 is operated using the main drive pulse (detection drive pulse) without using the auxiliary drive pulse will be referred to as a first rotation state. Furthermore, a state that the indicating hand is operated using the auxiliary drive pulse after the first rotation state will be referred to as a second rotation state.

Next, a configuration example of the motor 20 will be described.

Figure 5:
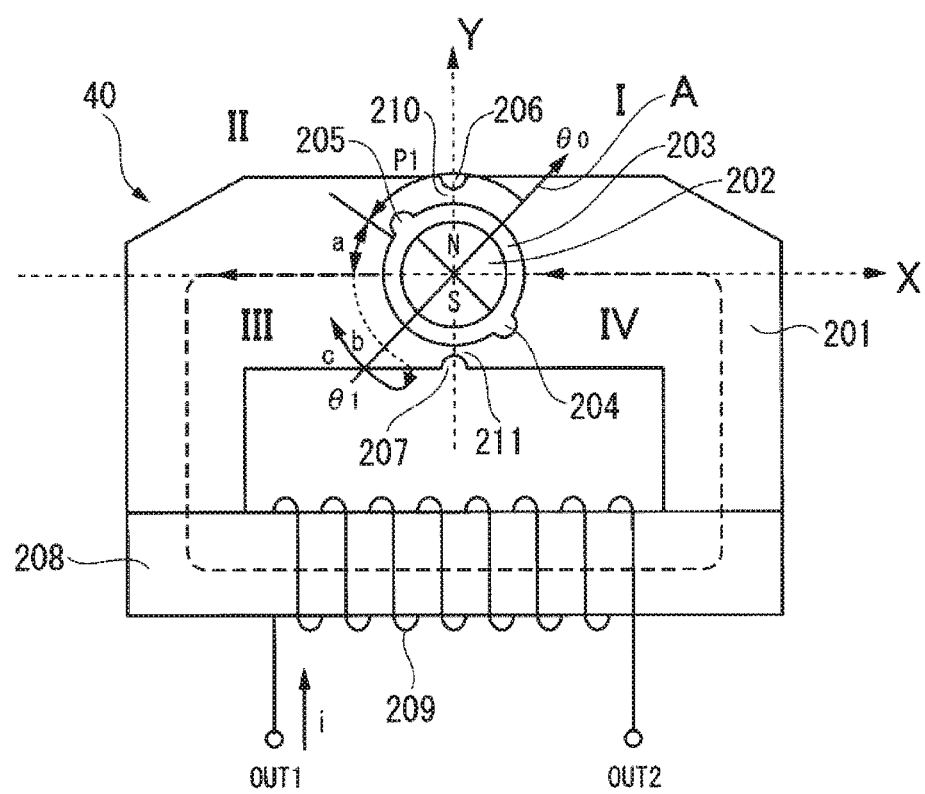
FIG. 5 illustrates a configuration example of a motor according to the present embodiment.

FIG. 5 illustrates the configuration example of the motor 20 according to the present embodiment.

When the motor 20 is used for an analog electronic timepiece, a stator 201 and a coil core 208 are fixed to a main plate (not illustrated) by a screw (not illustrated), and are joined to each other. The drive coil 209 has a first terminal OUT1 and a second terminal OUT2.

A rotor 202 is magnetized in two poles (south pole and north pole). An outer end portion of the stator 201 formed of a magnetic material is provided with a plurality of (two in the present embodiment) cutout portions (outer notches) 206 and 207 at positions facing each other across a rotor accommodating through-hole 203. Saturable portions 210 and 211 are disposed between the respective outer notches 206 and 207 and the rotor accommodating through-hole 203.

The saturable portions 210 and 211 are not magnetically saturated depending on a magnetic flux of the rotor 202, and are configured so as to be magnetically saturated and magnetic resistance increases when the drive coil 209 is excited. The rotor accommodating through-hole 203 is configured to have a circular hole shape in which a plurality of (two in the present embodiment) crescentic cutout portions (inner notches) 204 and 205 are integrally formed in facing portions of a through-hole having a circular contour.

The cutout portions 204 and 205 configure a positioning portion for determining a stop position of the rotor 202. In a state where the drive coil 209 is not excited, the rotor 202 is located at a position corresponding to the positioning portion as illustrated in FIG. 5. In other words, the rotor 202 is stably stopped at a position (position of an angle $\theta_0$) where a magnetic pole axis A of the rotor 202 is orthogonal to a line segment connecting the cutout portions 204 and 205 to each other. An XY-coordinate space centered on a rotation axis (rotation center) of the rotor 202 is divided into four quadrants (first quadrant I to fourth quadrant IV).

Here, the main drive pulse having the rectangular wave is supplied from the indicating hand drive unit 121 to between the terminals OUT1 and OUT2 of the drive coil 209 (for example, the first terminal OUT1 side is set to a cathode, and the second terminal OUT2 side is set to an anode). If a drive current i flows in a direction indicated by an arrow in FIG. 5, a magnetic flux is generated in the stator 201 in a direction indicated by a broken line arrow. In this manner, the saturable portions 210 and 211 are saturated and the magnetic resistance of the resistor increases. Thereafter, due to interaction between the magnetic pole generated in the stator 201 and the magnetic pole of the rotor 202, the rotor 202 is rotated 180 degrees in the direction indicated by the arrow in FIG. 5, and is stably stopped at a position where the magnetic pole axis shows an angle $\theta_1$. A rotation direction (counterclockwise direction in FIG. 5) for allowing a normal operation (indicating hand operation since the present embodiment employs the analog electronic timepiece) to be performed by rotationally driving the stepping motor 107 will be referred to as the forward direction, and a direction opposite thereto (clockwise direction) will be referred to as the rearward direction.

If the drive current i in a direction opposite to the arrow in FIG. 5 by supplying the main drive pulse having the rectangular wave of the opposite polarity from the indicating hand drive unit 121 to the terminals OUT1 and OUT2 of the drive coil 209 (the first terminal OUT1 side is set to the anode, and the second terminal OUT2 side is set to the cathode so as to have the opposite polarity compared to the precedent driving), the magnetic flux is generated in the stator 201 in the direction opposite to the broken arrow. In this manner, the saturable portions 210 and 211 are first saturated. Thereafter, due to the interaction between the magnetic pole generated in the stator 201 and the magnetic pole of the rotor 202, the rotor 202 is rotated 180 degrees in the same direction (forward direction), and is stably stopped at a position where the magnetic pole axis shows the angle $\theta_0$.

Thereafter, in this way, the indicating hand drive unit 121 supplies a signal (alternating signal) having different polarity to the drive coil 209. In this manner, the motor 20 repeatedly performs the operation. A configuration is adopted in which the rotor 202 can be continuously rotated every 180 degrees in the direction of the arrow.

The indicating hand drive unit 121 rotationally drives the motor 20 by alternately driving the motor 20 by using the drive pulse P1 having mutually different polarities. In a case where the motor 20 cannot be rotated using the main drive pulse P1, the motor 20 is rotationally driven using the auxiliary drive pulse P2 having the polarity the same as the polarity of the main drive pulse P1 after a section T3 (to be described later).

Next, an operation of the switching elements Q1 to Q6 when the motor 20 is driven and an example of the induced voltage generated when the motor is rotated will be described. In the following example, a case where the motor 20 is rotated forward will be described.

Figure 6:
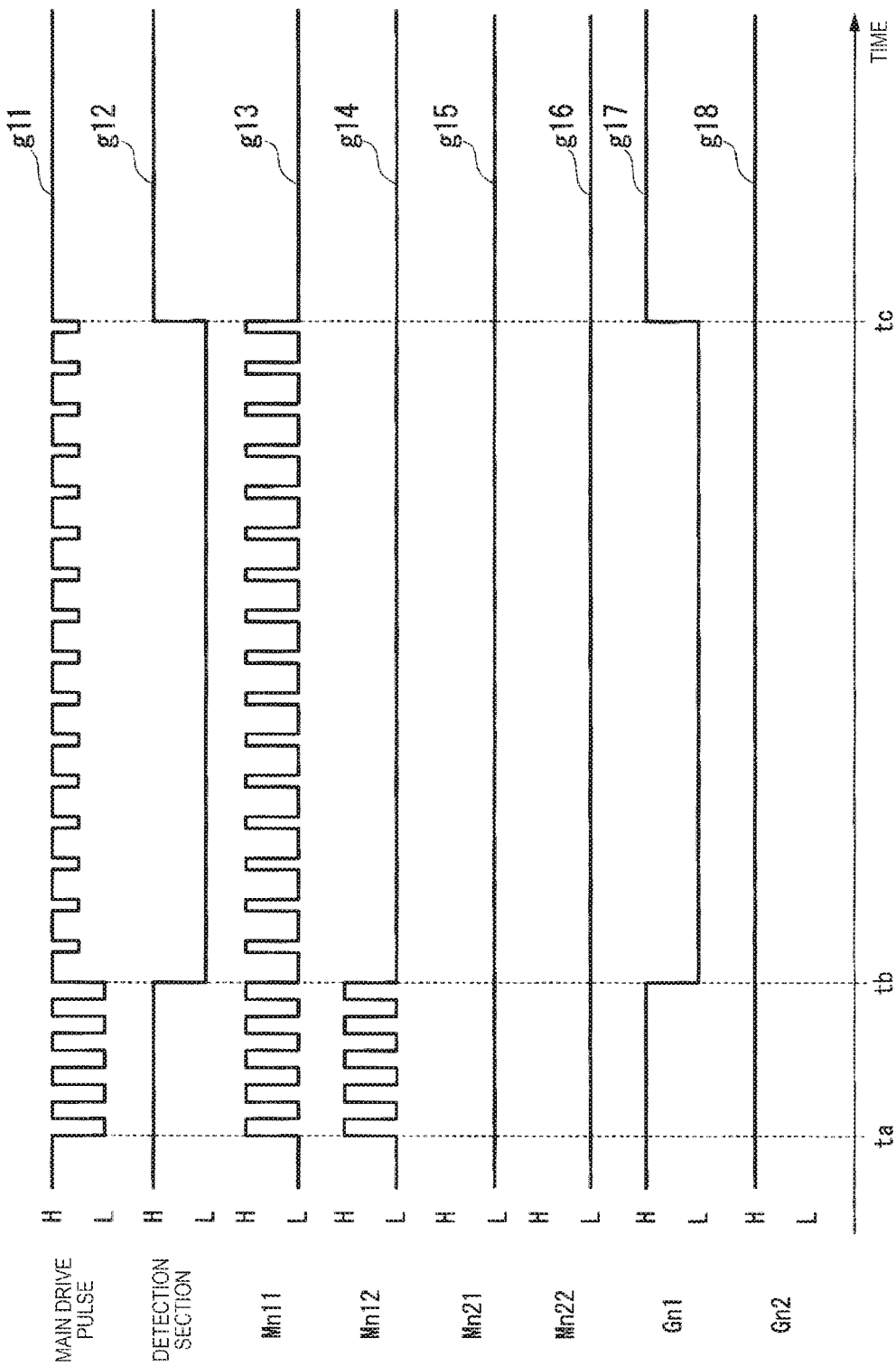
FIG. 6 illustrates an example of a main drive pulse and an induced voltage generated when the motor is rotated according to the present embodiment.

FIG. 6 illustrates an example of the main drive pulse P1 and the example of the induced voltage generated when the motor is rotated according to the present embodiment. In FIG. 6, the horizontal axis represents a time, and the vertical axis represents whether the signal is in an H-level or in an L-level. A waveform g11 is a waveform of the main drive pulse P1 and the detection pulse which are output from the first output terminal Outn1 of the indicating hand drive unit 121. A waveform g12 indicates a detection section. A waveform g13 is a waveform of the control signal Mn11 input to the gate of the switching element Q3. A waveform g14 is a waveform of the control signal Mn12 input to the gate of the switching element Q1. A waveform g15 is a waveform of the control signal Mn21 input to the gate of the switching element Q4. A waveform g16 is a waveform of the control signal Mn22 input to the gate of the switching element Q2. A waveform g17 is a waveform of the control signal Gn1 input to the gate of the switching element Q5. A waveform g18 is a waveform of the control signal Gn2 input to the gate of the switching element Q6.

A state illustrated in FIG. 6 represents a state during the period of times t1 to t3 in FIG. 4.

In FIG. 6, in the switching elements Q3, Q4, Q5, and Q6, the signal input to the gate is in a period of the L-level and the ON-state, and the signal input to the gate is in a period of the H-level and the OFF-state. In the switching elements Q1 and Q2, the signal input to the gate is in a period of the H-level and the ON-state, and the signal input to the gate is in a period of the L-level and the OFF-state.

A period of times ta to tb represents a drive section.

A period of times tb to tc represents a detection section in a rotation state.

During the period of times ta to tb representing the drive section, as illustrated by the waveform g13 and the waveform g14, the pulse control unit 11 switches the switching elements Q3 and Q1 between the ON-state and the OFF-state at a predetermined cycle in response to the main drive pulse P1 having the comb tooth wave. In this manner, the pulse control unit 11 controls the motor 20 to be rotated in the forward direction. In a case where the motor 20 is normally rotated, the rotor included in the motor 20 is rotated 180 degrees in the forward direction. During this period, the switching elements Q2, Q5, and Q6 are respectively in the OFF-state, and the switching element Q4 is in the ON-state.

During the period of times tb to tc representing the detection section, the pulse control unit 11 maintains the OFF-state of the switching element Q1, switches the switching element Q3 between the ON-state and the OFF-state at a predetermined timing, and controls the switching element Q3 to be in a high-impedance state. In this detection section, the pulse control unit 11 controls the switching element Q5 to be switched to the ON-state. During the detection period, the pulse control unit 11 maintains the on-state of the switching element Q4, and controls the switching elements Q2 and Q6 to be switched to the OFF-state.

In this manner, in the detection section, a detection loop in which the switching elements Q4 and Q5 are in the ON-state and the switching element Q3 is in the OFF-state, and a closed loop in which the switching elements Q4 and Q5 are in the ON-state and the switching element Q3 is in the ON-state are alternately repeated at a predetermined cycle. In this case, in a state of the detection loop, the loop is configured to include the switching elements Q4 and Q5 and the resistor R1. Accordingly, the motor 20 is not braked. On the other hand, in a state of the closed loop, the loop is configured to include the switching elements Q3 and Q4 and the drive coil 209 belonging to the motor 20. Thus, the drive coil 209 is short-circuited. Accordingly, the motor 20 is braked, and free vibration of the motor 20 is suppressed.

In the detection section, the induced current flows in the resistor R1 in the direction the same as the flowing direction of the drive current. As a result, an induced voltage signal VRs is generated in the resistor R1. The comparator Q7 compares the induced voltage signal VRs and the reference voltage Vcomp with each other for each of the sections T1, T2, and T3. In a case where the induced voltage signal VRs is equal to or smaller than the reference voltage Vcomp, the comparator Q7 outputs a signal indicating "1". In a case where the induced voltage signal VRs is greater than the reference voltage Vcomp, the comparator Q7 outputs a signal indicating "0". As will be described later with reference to FIG. 7, the section T1 is the first section in the detection section. The section T2 is the second section in the detection section, and the section T3 is the third section in the detection section.

During a period of times t3 to t5 in FIG. 4, a second drive pulse is generated. In this manner, in the drive section, the pulse control unit 11 switches the switching elements Q4 and Q2 between the ON-state and the OFF-state at a predetermined cycle in response to the main drive pulse P1. In this manner, the pulse control unit 11 controls the motor 20 to be rotated in the forward direction. During this period, the switching elements Q1, Q5, and Q6 are respectively in the OFF-state, and the switching element Q3 is in the ON-state.

In the detection section, the pulse control unit 11 maintains the OFF-state of the switching element Q2, switches the switching element Q4 between the ON-state and the OFF-state at a predetermined timing, and controls the switching element Q4 to be in a high-impedance state. In the detection section, the pulse control unit 11 controls the switching element Q6 to be switched to the ON-state. During the detection period, the pulse control unit 11 maintains the ON-state of the switching element Q3, and controls the switching elements Q1 and Q5 to be in the OFF-state. In this manner, the induced current flows in the resistor R2 in the direction the same as the flowing direction of the drive current. As a result, the induced voltage signal VRs is generated in the resistor R2. The comparator Q7 compares the induced voltage signal VRs and the reference voltage Vcomp with each other for each section of the sections T1, T2, and T3. In a case where the induced voltage signal VRs is equal to or smaller than the reference voltage Vcomp, the comparator Q7 outputs the signal indicating "1". In a case where the induced voltage signal VRs is greater than the reference voltage Vcomp, the comparator Q7 outputs the signal indicating "0".

Next, a relationship between a load state and the induced voltage will be further described with reference to FIG. 7.

Figure 7:
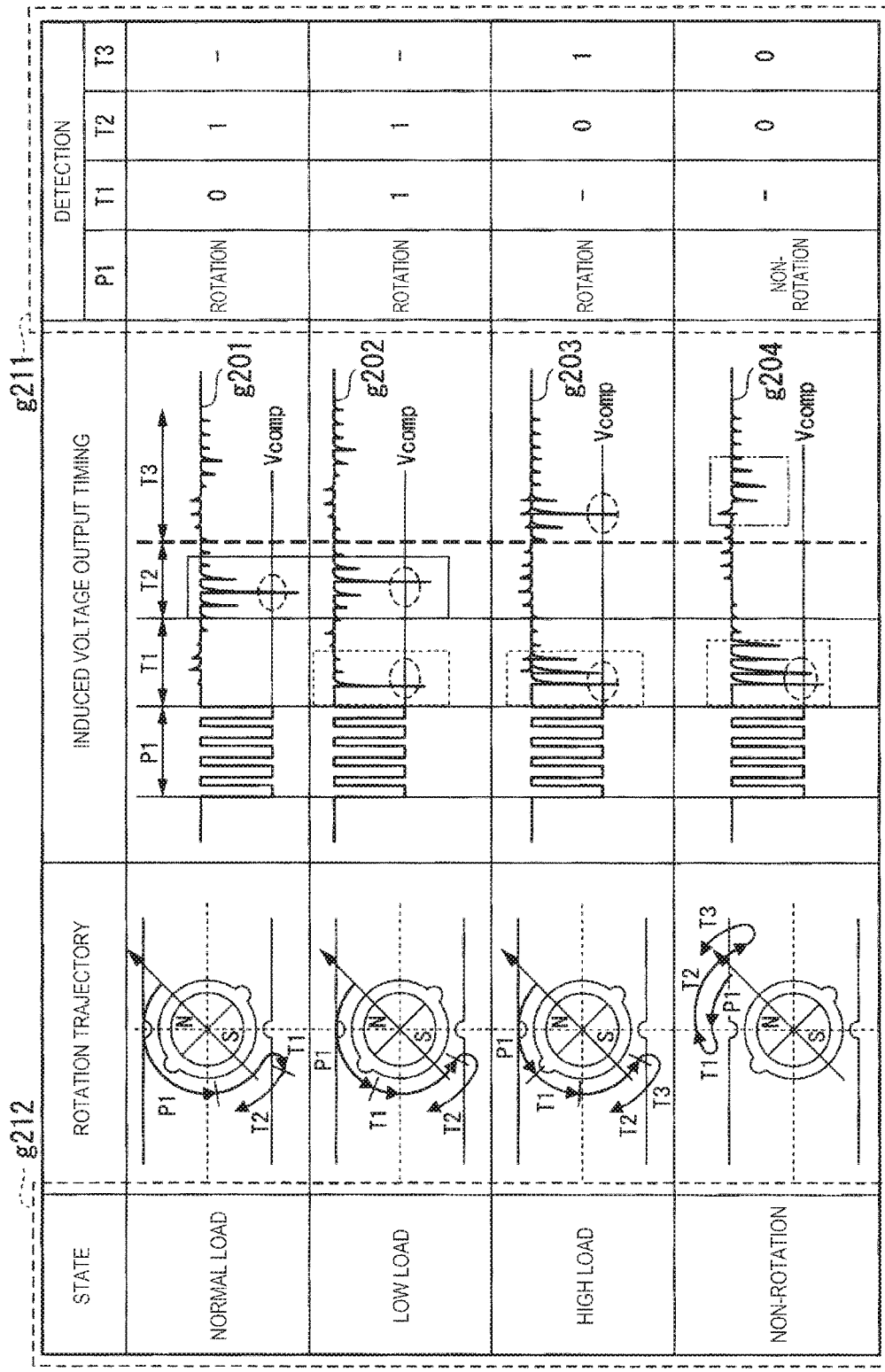
FIG. 7 is a view for describing a relationship between a load state and the induced voltage according to the present embodiment.

FIG. 7 is a view for describing the relationship between the load state and the induced voltage according to the present embodiment. In FIG. 7, a reference numeral P1 indicates the drive pulse P1. A reference numeral T1 indicates the section T1. A reference numeral T2 indicates the section T2. A reference numeral T3 indicates the section T3. Waveforms g201 to g204 show a schematic combination between the signal CO1 input to the comparator Q7 and the drive pulse P1.

In a case where the load applied to the motor 20 is normal (normal load), as illustrated by the waveform g201, in the section T2, the induced voltage signal VRs is equal to or greater than the reference voltage Vcomp. Therefore, an output of the comparator Q7 is "0" in the section T1, "1" in the section T2, and "–" in the section T3. Here, "–" indicates that the output may be "0" or may be "1".

In a case where the load applied to the motor 20 is low (low load), as illustrated by the waveform g202, in the section T1 and the section T2, the induced voltage signal VRs is equal to or greater than the reference voltage Vcomp. Therefore, the output of the comparator Q7 is "1" in the section T1, "1" in the section T2, and "–" in the section T3.

In a case where the load applied to the motor 20 is high (high load), as illustrated by the waveform g203, in the section T1 and the section T3, the induced voltage signal VRs is equal to or greater than the reference voltage Vcomp. Therefore, the output of the comparator Q7 is "–" in the section T1, "0" in the section T2, and "1" in the section T3.

In a case where the motor 20 is not rotated (non-rotation), as illustrated by the waveform g204, in the section T1, the induced voltage signal VRs is equal to or greater than the reference voltage Vcomp. Therefore, the output of the comparator Q7 is "–" in the section T1, "0" in the section T2, and "0" in the section T3.

In a case where a non-rotation state is detected at the main drive pulse P1, the pulse control unit 11 controls the motor 20 to be rotationally driven using the auxiliary drive pulse P2 having the polarity same as that of the main drive pulse P1.

That is, it is possible to detect the load state or the non-rotation state of the motor 20 by combining the outputs in the sections T1 to T3 of the comparator Q7 with each other.

The storage unit 5 stores data by associating the output of the comparator Q7 in the sections T1 to T3 of the region surrounded by a reference numeral g211 in FIG. 7 with the load state or the rotation state of the region surrounded by a reference numeral g212.

Next, a schematic procedure will be described. In the procedure, the control unit 10 changes a pulse magnitude (pulse duty) of the drive pulse P1 serving as the comb tooth wave so as to detect an indicating hand position, based on the output of the comparator Q7 at that time.

Figure 8:
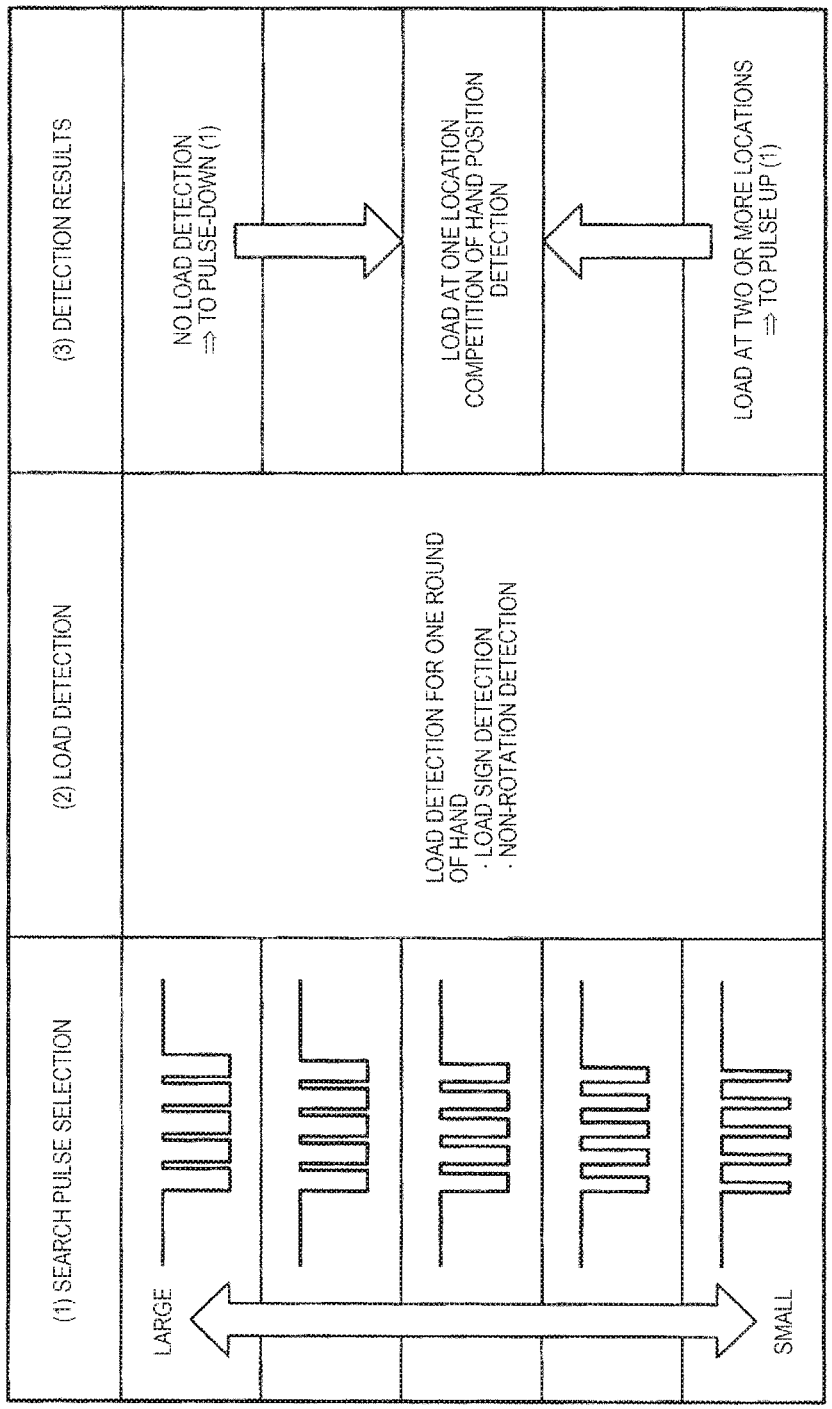
FIG. 8 is a view for describing a schematic procedure of detecting an indicating hand position according to the present embodiment.

FIG. 8 is a view for describing the schematic procedure of detecting the indicating hand position according to the present embodiment. The control unit 10 performs the following process in a hand position detection operation mode for detecting the position of the indicating hand 40, for example, when the battery 2 is replaced, when the power is brought into the ON-state for the first time, at every predetermined time (for example, once a day), or when settings are initialized. The search pulse used for detecting the reference position of the indicating hand 40 is stored in the storage unit 5. As illustrated in FIG. 8, the search pulse is the main drive pulse for detecting the reference position. The search pulse is configured to include a plurality of pulses having different pulse magnitudes (duties). The search pulse is the detection drive pulse based on the main drive pulse.

The pulse control unit 11 outputs the pulse signal corresponding to one round of the indicating hand 40 to the indicating hand drive unit 121, based on an initial value of the main drive pulse P1.

The pulse control unit 11 acquires the output of the comparator Q7 as much as one round of the indicating hand 40 in the sections T1 to T3 after the pulse signal is output. For example, in a case where the indicating hand 40 is the second hand, the pulse control unit 11 controls the comparator Q7 to output the pulse signal 60 times. Each time the pulse is output, the pulse control unit 11 stores the output of the comparator Q7 in the sections T1 to T3 in the storage unit 5. Specifically, the pulse control unit 11 stores the output by associating the first pulse with "0" in the section T1, "1" in the section T2, and "0" in the section T3, and associating the second pulse with "0" in the section T1, "1" in the section T2, and "0" in the section T3. The subsequent pulses are stored in the same manner.

The pulse control unit 11 compares a combination of the acquired outputs of the comparator Q7 in the sections T1 to T3 with a pattern of the outputs of the comparator Q7 in the sections T1 to T3 which are stored in the storage unit 5, and detects a state of the motor 20. The state of the motor 20 means whether or not the motor 20 has a low load (load is low), whether or not the motor 20 has a high load (load is high), and whether or not the motor 20 is in a non-rotation state.

The pulse control unit 11 changes a magnitude of the main drive pulse, based on a detection result. In the present embodiment, a process of lengthening an L-level of the pulse in the main drive pulse or a process of lengthening a pulse width will be referred to as pulse-up (PULSE-UP). In the present embodiment, a process of reducing the length of the L-level of the pulse in the drive pulse or a process of shortening the pulse width will be referred to as pulse-down (PULSE-DOWN).

The pulse control unit 11 changes the magnitude of the pulse so as to change an output state of the comparator Q7 for each position of the indicating hand 40 in one round (360 degrees) of the indicating hand 40.

In a case where there is no configuration element whose load fluctuates in the train wheel 30, during one round of the indicating hand 40, a normal load state ("0" in the section T1, "1" in the section T2, and "0" in the section T3) described in FIG. 7 is repeated 60 times.

In the present embodiment, as described above, a configuration element whose load fluctuates is present in the train wheel 30. Accordingly, while the indicating hand 40 is rotated 360 degrees, the load fluctuates at one location. Therefore, even in the normal state, if the magnitude of the search pulse is proper, the load is high at a position where the configuration element whose load fluctuates is present in the train wheel 30. Accordingly, the section T2 shows "0", and the section T3 shows "1". In this way, in a case where the load increases at one location in one round of the indicating hand 40, the location is the detection position of the indicating hand. Specifically, a position where it is detected that the section T2 shows "0" and the section T3 shows "1" is the reference position. In the present embodiment, in this way, detecting the position where the load increases will be referred to as hand position detection.

In a case where the pulse excessively becomes larger (length of the L-level of the pulse is increased), the rotor 202 is likely to be rotated. Accordingly, load is less likely to be detected, and the reference position is less likely to be detected. In this way, in a case where the load is no longer detected, the pulse control unit 11 performs the pulse-down.

On the other hand, in a case where the pulse excessively becomes small (length of the L-level of the pulse is decreased), the rotor 202 is less likely to be rotated, and the load increases. Accordingly, a high load state occurs multiple times. In this way, in a case where the load is detected twice or more times, the pulse control unit 11 performs the pulse-up.

In this manner, according to the present embodiment, the indicating hand 40 is operated one round (360 degrees) so as to acquire detection results in the sections T1 to T3 during the indicating hand operation. Based on the acquired results, the reference position of the indicating hand 40 can be detected. In the present embodiment, it is desirable to perform the hand position detection by using the main drive pulse which does not bring the indicating hand 40 into a non-rotation state even in a case where the pulse-down is performed.

Next, a processing procedure example for performing the hand position detection will be described.

Figure 9:
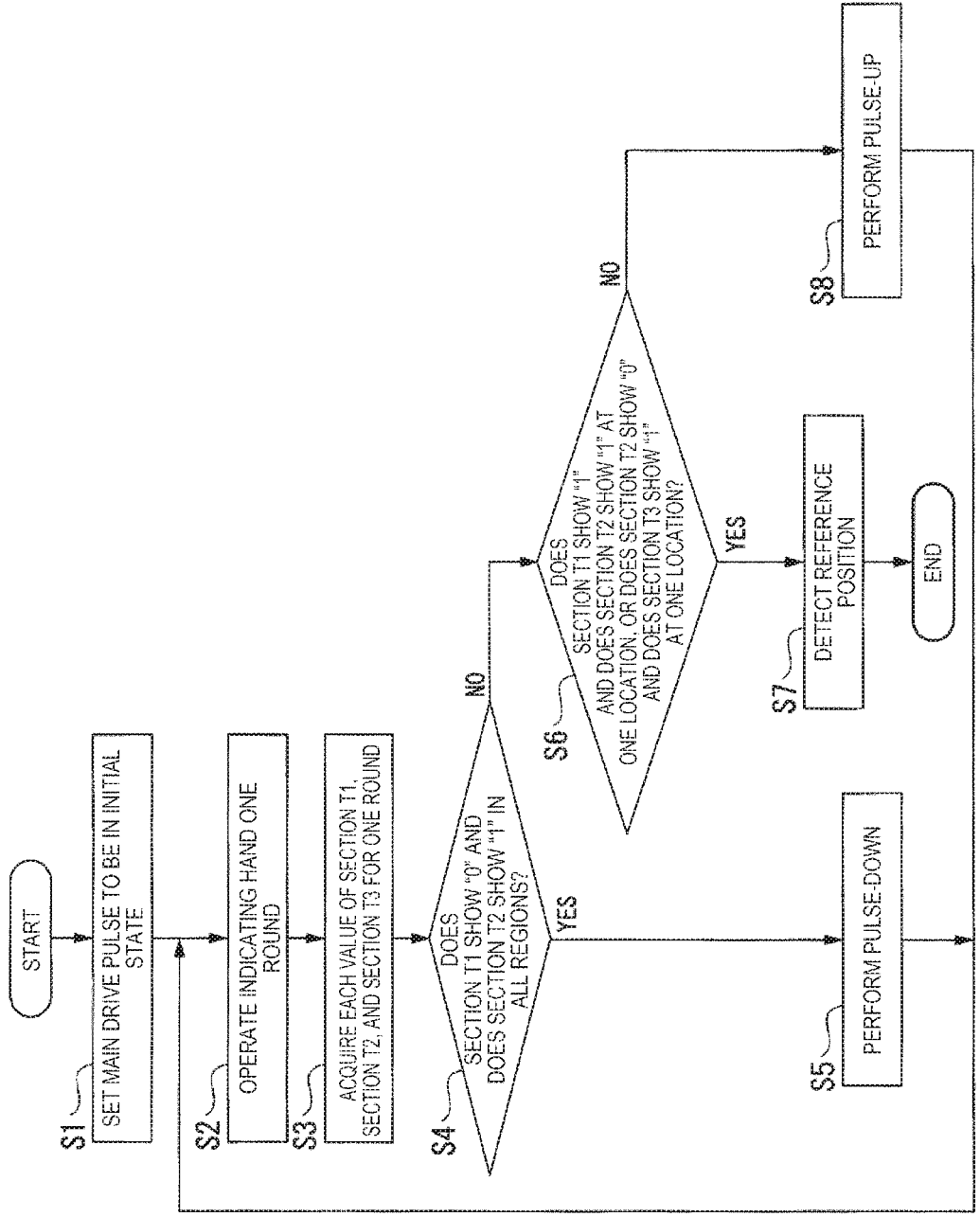
FIG. 9 is a flowchart illustrating a processing procedure example of detecting a hand position according to the present embodiment.

FIG. 9 is a flowchart illustrating the processing procedure example for performing the hand position detection according to the present embodiment. Referring to an example illustrated in FIG. 9, an example will be described in which the load at the reference position is higher than the load at the other position.

(Step S1) The pulse control unit 11 sets the main drive pulse to be in an initial state.

(Step S2) The pulse control unit 11 generates the main drive pulse so that the indicating hand 40 is operated one round (360 degrees). Based on the generated main drive pulse, the pulse control unit 11 controls the indicating hand drive unit 121. Subsequently, the indicating hand drive unit 121 drives the motor 20 so that the indicating hand 40 is operated one round (360 degrees).

(Step S3) The pulse control unit 11 acquires the output of the motor load detection unit 122 in each of the section T1, the section T2, and the section T3 for one round. Each time the pulse is output, the pulse control unit 11 stores the output of the motor load detection unit 122 in each of the sections T1 to T3 in the storage unit 5.

(Step S4) After the indicating hand operation for one round is completed, the pulse control unit 11 identifies whether or not the section T1 shows "0" and the section T2 shows "1" in all of the regions (one round of 0 to 359 degrees). In a case where the pulse control unit 11 identifies that the section T1 shows "0" and the section T2 shows "1" in all of the regions (Step S4; YES), the pulse control unit 11 proceeds to the process in Step S5. In a case where the section T1 does not show "0" and the section T2 does not show "1" in all of the regions (Step S4; NO), the process proceeds to the process in Step S6.

(Step S5) In a case where the section T1 shows "0" and the section T2 shows "1" in all of the regions, all of the regions are in the normal load state. There is enough room for rotation, and in this state, the load cannot be detected. In this case, in order to easily detect the load, it is necessary to make the rotation difficult. Therefore, the pulse control unit 11 performs the pulse-down as much as one pulse. That is, the pulse control unit 11 decreases the length of the L-level of the main drive pulse as much as one level. In other words, the pulse control unit 11 sets first energy to second energy which is lower than the first energy. For example, the pulse control unit 11 shortens the length of the L-level of the main drive pulse as much as one clock based on the frequency generated by the frequency divider circuit 4. After the process is performed, the pulse control unit 11 returns to the process in Step S2.

(Step S6) In a case where the section T1 shows "1" and the section T2 shows "1" at one location (one region) or in a case where the section T2 shows "0" and the section T3 shows "1" at one location (one region) (Step S6; YES), the pulse control unit 11 proceeds to the process in Step S7. In a case where the section T1 shows "1" and the section T2 shows "1" at multiple locations (multiple regions) or in a case where the section T2 shows "0" and the section T3 shows "1" at multiple locations (multiple regions) (Step S6; NO), the pulse control unit 11 proceeds to the process in Step S8.

(Step S7) In the case where the section T1 shows "1" and the section T2 shows "1" at one location (one region) or in the case where the section T2 shows "0" and the section T3 shows "1" at one location (one region), the pulse control unit 11 specifies a position where the load is detected as the reference position, and stores the reference position in the storage unit 5. After the reference position is specified, the pulse control unit 11 stores the main drive pulse which is a search pulse when the reference position is specified, as an optimal pulse in the storage unit 5, and completes the process for the hand position detection. The pulse control unit 11 may use the drive pulse when the reference position is specified in this way, for the drive pulse in the normal indicating hand operation.

(Step S8) In the case where the section T1 shows "1" and the section T2 shows "1" at multiple locations (multiple regions) or in the case where the section T2 shows "0" and the section T3 shows "1" at multiple locations (multiple regions), the pulse control unit 11 performs the pulse-up as much as one pulse. That is, the pulse control unit 11 increases the length of the L-level of the main drive pulse as much as one level. In other words, the pulse control unit 11 sets the first energy to the third energy higher than the first energy. For example, the pulse control unit 11 increases the length of the L-level of the main drive pulse as much as one clock based on the frequency generated by the frequency divider circuit 4. After the process is performed, the pulse control unit 11 returns to the process in Step S2.

In a case where the reference position cannot be detected using the main drive pulse since there is a relatively great difference in the loads between the reference position and the normal position due to manufacturing variations, the pulse control unit 11 also detects the reference position by using the auxiliary drive pulse, and stores the reference position in the storage unit 5. In this way, in a case where the reference position is detected using the auxiliary drive pulse (the section T2 shows "0" and the section T3 shows "0"), the pulse control unit 11 may not store the main drive pulse and the auxiliary drive pulse which enable the reference position to be detected, as the optimal pulse in the storage unit 5.

In the process illustrated in FIG. 9, a position having a high load may be present across two or more steps of the indicating hand 40, in some cases. However, in a case where two or more loads are consecutively obtained, the pulse control unit 11 detects a position corresponding to the output number of the pulses from which the load is detected for the first time, as the reference position. The position having a high load or the position from which the load is detected means a position where the section T1 shows "1" and the section T2 shows "1" or a position where the section T2 shows "0" and the section T3 shows "1".

Here, a schematic process illustrated in FIG. 9 will be described.

The pulse control unit 11 uses the main drive pulse (first energy) in an initial state so that the indicating hand 40 is rotated one round. In this manner, the pulse control unit 11 acquires each value of the sections T1 to T3. The main drive pulse in the initial state means the main drive pulse used for the indicating hand operation, or the main drive pulse which enables the reference position to be previously detected.

When the indicating hand 40 is rotated one round by using the main drive pulse in the initial state, in a case where the pulse control unit 11 finds one location where the load increases, the pulse control unit 11 determines the location as the first region (FIG. 2), that is, the reference position.

In a case where the pulse control unit 11 uses the main drive pulse in the initial state and does not find any one location where the load increases, the pulse control unit 11 performs the pulse-down until the main drive pulse reaches a state where there is one location of a low load or a high load (FIG. 7). The main drive pulse subjected to the pulse-down is the second energy, and the main drive pulse further subjected to the pulse-down from the second energy is the third energy.

Furthermore, in a case where any one location cannot be found even if the pulse-down is performed until the main drive pulse reaches a state where there is one location of the low load or the high load, the pulse control unit 11 also uses the auxiliary drive pulse so as to perform the pulse-down until there is one location in a state of non-rotation (FIG. 7).

The main drive pulse in the initial state is used so that the indicating hand 40 is rotated one round. As a result, in a case where multiple locations of the low load or the high load (FIG. 7) are found, the pulse control unit 11 detects the reference position by performing the pulse-up until the main drive pulse reaches a state where there is one location of the low load or the high load (FIG. 7).

The processing procedure described above is an example, and the processing procedure may be changed depending on applications. A lower limit may be set for the pulse-down, and an upper limit may be set for the pulse-up so that the upper and lower limits are stored in the storage unit 5 in advance. In a case where the upper and lower limits are stored in this way, and in a case where the pulse control unit 11 cannot find one position where the load increases even if the pulse control unit 11 performs the pulse-up to reach the upper limit, the pulse control unit 11 may detect the reference position by returning to the initial state again, or may notify a user of the detection result after determining that there is abnormality. Alternatively, in a case where the pulse control unit 11 cannot find one position where the load increases even if the pulse control unit 11 performs the pulse-down to reach the lower limit, the pulse control unit 11 may detect the reference position by returning to the initial state again, or may notify a user of the detection result after determining that there is abnormality.

As described above, according to the present embodiment, means for enabling the control unit 10 to grasp the reference position of the indicating hand 40 in the timepiece 1 can be realized using a predetermined load for enabling the normal hand operation.

According to the above-described embodiment, in a case where two or more loads are consecutively obtained in the process in FIG. 9, the pulse control unit 11 detects the position corresponding to the output number of pulses from which the load is detected for the first time, as the reference position. However, the present embodiment is not limited thereto. In a case where two or more loads are consecutively obtained, the pulse control unit 11 may detect a position corresponding to the output number of pulses from which the highest fluctuation in the load is detected, as the reference position.

According to the above-described embodiment, in the process in FIG. 9, in a case where the pulse control unit 11 identifies that the section T1 shows "0" and the section T2 shows "1" in all of the regions (Step S4; YES), the pulse control unit 11 proceeds to the process in Step S5. That is, the control unit 10 performs the pulse-down as much as one pulse, in a case where the load fluctuation is not identified in the indicating hand operation for one round. However, in a case where the load fluctuation is not identified in the indicating hand operation for one round, the control unit 10 may detect the load again in the indicating hand operation for one round without changing the energy of the main drive pulse.

Furthermore, according to the above-described embodiment, in the process in FIG. 9, in a case where the section T1 shows "1" and the section T2 shows "1" at multiple locations (multiple regions), or in a case where the section T2 shows "0" and the section T3 shows "1" at multiple locations (multiple regions) (Step S6; NO), the pulse control unit 11 proceeds to the process in Step S8. That is, the pulse control unit 11 performs the pulse-up as much as one pulse, in a case where the load fluctuations are identified multiple times in the indicating hand operation for one round. However, in a case where the load fluctuations are discontinuously identified multiple times in the indicating hand operation for one round, the pulse control unit 11 may detect the load again in the indicating hand operation for one round without changing the energy of the main drive pulse.

Figure 10:
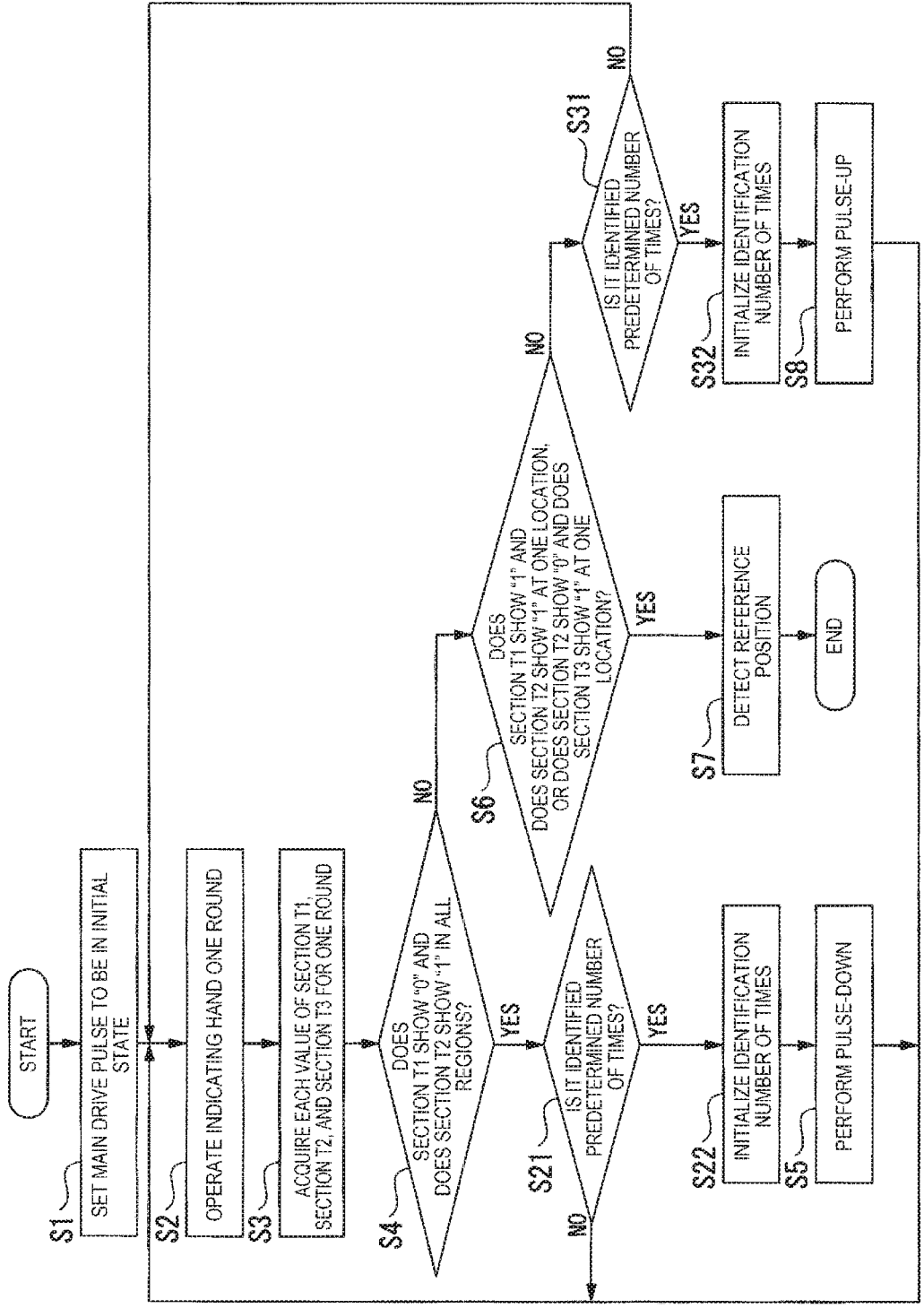
FIG. 10 is a flowchart illustrating a processing procedure example of detecting a hand position according to a modification example of the present embodiment.

The above-described processes will be described in detail with reference to FIG. 10. The processes other than those described below are the same as those in the above-described embodiment.

(Step S4) In a case where the pulse control unit 11 identifies that the section T1 shows "0" and the section T2 shows "1" in all of the regions (Step S4; YES), the pulse control unit 11 proceeds to the process in Step S21.

(Step S21) The pulse control unit 11 identifies whether or not a first identification number of times to identify that the section T1 shows "0" and the section T2 shows "1" in all of the regions in Step S4 is a first predetermined number of consecutive times (for example, twice). In a case where the pulse control unit 11 identifies that the first identification number of times is the first predetermined number of consecutive times (Step S21; YES), the pulse control unit 11 proceeds to the process in Step S22. In a case where the pulse control unit 11 identifies that the first identification number of times is not the first predetermined number of consecutive times (Step S21; NO), the pulse control unit 11 returns to the process in Step S2.

(Step S22) The pulse control unit 11 initializes the number of times (first identification number of times) to identify that the section T1 shows "0" and the section T2 shows "1" in all of the regions in Step S4. The pulse control unit 11 proceeds to the process in Step S5 after the process is performed.

(Step S6) In a case where the section T1 shows "1" and the section T2 shows "1" at multiple locations (multiple regions), or in a case where the section T2 shows "0" and the section T3 shows "1" at multiple locations (multiple regions) (Step S6; NO), the pulse control unit 11 proceeds to the process in Step S31.

(Step S31) The pulse control unit 11 identifies whether or not a second identification number of times to identify that the section T1 shows "1" and the section T2 shows "1" at multiple locations (multiple regions) in Step S6 or that the section T2 shows "0" and the section T3 shows "1" at multiple locations (multiple regions) is a second predetermined number of consecutive times (for example, twice). In a case where the pulse control unit 11 identifies that the second identification number of times is the second predetermined number of consecutive times (Step S31; YES), the pulse control unit 11 proceeds to the process in Step S32. In a case where the pulse control unit 11 identifies that the second identification number of times is not the second predetermined number of consecutive times (Step S31; NO), the pulse control unit 11 returns to the process in Step S2.

(Step S32) The pulse control unit 11 initializes the number of times (second identification number of times) to identify that the section T1 shows "1" and the section T2 shows "1" at multiple locations (multiple regions) in Step S6, or that the section T2 shows "0" and the section T3 shows "1" at multiple locations (multiple regions). The pulse control unit 11 proceeds to the process in Step S8 after the process is performed.

Here, a case will be described where the reference load unit is disposed in a tooth of a first gear and the number of teeth of the first gear is different from the number of teeth of a second gear meshing with the first gear. In this case, a phase of the second gear when the second gear meshes with the reference load unit of the first gear is changed each time the first gear is rotated once. Therefore, due to manufacturing variations and aged deterioration of the second gear, a magnitude of the load fluctuation caused by the reference load unit is changed each time the first gear is rotated once. In this manner, depending on the phase of the second gear, the control unit 10 may not be able to identify the load fluctuation in the indicating hand operation for one round, in some cases. Therefore, the pulse control unit 11 performs the above-described processes in Step S21 and Step S22. In this manner, it is possible to prevent the pulse control unit 11 from determining that a temporary load decrease caused by a change in the phase of the second gear occurs due to an excessively strong pulse. Accordingly, excessive pulse-down of the search pulse can be prevented so as to prevent the energy of the optimal pulse from being insufficiently supplied.

Next, a case will be described where a torque for the indicating hand operation fluctuates due to a foreign substance adhering to the train wheel 30. In this case, the motor load detection unit 122 may detect an increase in the load at a cycle different from a cycle of the indicating hand 40 rotated one round. Therefore, the pulse control unit 11 performs the processes in Step S31 and Step S32 described above. In this manner, in a case where the torque for the indicating hand operation fluctuates due to the foreign substance at a cycle longer than a cycle of the indicating hand 40 rotated one round, even if the load increase caused by the foreign substance is detected during the first round of the indicating hand 40, it is possible to avoid the load increase caused by the foreign substance from being detected during the second round. In this manner, the load increase resulting from the fluctuation in the torque for the indicating hand operation due to the foreign substance can be prevented from being determined as the load increase caused by the reference load unit. Accordingly, excessive pulse-up of the search pulse can be prevented so as to prevent the energy of the optimal pulse from being excessively supplied.

The control unit 10 may invalidate the load fluctuation occurring at the cycle different from the cycle of the indicating hand 40 rotated one round. For example, the control unit 10 identifies the cycle of the load fluctuation, based on the reference position and the cycle which are stored in the storage unit 5. In this manner, as described above, the load increase caused by the foreign substance at the cycle different from the cycle of the indicating hand 40 rotated one round can be prevented from being determined as the load increase caused by the reference load unit.

A program for entirely or partially realizing the functions of the control unit 10 in the present invention may be recorded on a computer-readable recording medium, and a computer system may read and execute the program recorded on the recording medium so that the processes to be performed by the control unit 10 are entirely or partially performed. The "computer system" described herein includes an OS or hardware such as peripheral devices. The "computer system" also includes a WWW system having a website providing environment (or display environment).

The "computer-readable recording medium" means a portable medium such as a flexible disk, a magneto-optical disk, a ROM, and a CD-ROM, or a storage device such as a hard disk to be internally installed in the computer system. Furthermore, the "computer-readable recording medium" includes those which hold the program for a certain period of time, as in a volatile memory (RAM) installed inside the computer system serving as a server or a client in a case where the program is transmitted via a network such as the Internet or a communication line such as a telephone line.

The program may be transmitted from the computer system having the program stored in the storage device to another computer system via a transmission medium or by using a transmission wave in the transmission medium. Here, the "transmission medium" for transmitting the program means a medium having a function of transmitting information, as in the network (communication network) such as the Internet, or the communication line (communication cable) such as the telephone line. The above-described program may be provided in order to partially realize the above-described function. Furthermore, the program may be a so-called difference file (differential program) which can realize the above-described function in combination with a program previously recorded on the computer system.

Hitherto, forms for embodying the present invention have been described with reference to the embodiment. However, the present invention is not limited to the embodiments at all. Various modifications and substitutions can be added to the embodiment within the scope not departing from the gist of the present invention.

What is claimed is:

1. A timepiece movement comprising:
   a stepping motor having a rotor for rotating an indicating hand; and
   a control unit for rotating the rotor by using a main drive pulse and an auxiliary drive pulse,
   wherein when the indicating hand is rotated using a detection drive pulse based on the main drive pulse, the control unit determines a reference position of the indicating hand by detecting a rotation state of the rotor.

2. The timepiece movement according to claim 1, further comprising:
   a reference load unit disposed at a predetermined position in a drive mechanism including the indicating hand and the rotor so as to apply a fluctuation to a load received by the rotor when the indicating hand is located at the reference position,
   wherein the control unit detects the rotation state of the rotor by detecting an induced voltage during at least one period in a detection period including a first detection period after the detection drive pulse is output, a second detection period subsequent to the first detection period, and a third detection period subsequent to the second detection period, and
   wherein the control unit determines the reference position, based on at least two detection results in the first detection period, the second detection period, and the third detection period.

3. The timepiece movement according to claim 2,
   wherein the control unit sets the detection drive pulse to first energy,
   wherein the control unit detects the rotation state of the rotor throughout one round period during which the indicating hand is rotated at least one round,
   wherein in a case where a load fluctuation applied by the reference load unit is not identified during the one round period, the control unit sets the detection drive pulse to second energy which is lower than the first energy, wherein the control unit detects the rotation state of the rotor in accordance with the one round period by using the detection drive pulse of the second energy, wherein in a case where the load fluctuation applied by the reference load unit is identified twice or more times during the one round period, the control unit sets the detection drive pulse to third energy which is higher than the first energy, wherein the control unit detects the rotation state of the rotor throughout the one round period by using the detection drive pulse of the third energy, and wherein in a case where the load fluctuation applied by the reference load unit is identified only once during the one round period, the control unit determines a position where the fluctuation is identified, as the reference position.

4. The timepiece movement according to claim 3, wherein when the control unit detects the rotation state of the rotor throughout the one round period during which the indicating hand is rotated at least one round, in a case where the control unit detects an induced voltage based on the reference load unit during the first detection period and the second detection period at one position in the one round period, or in a case where the control unit detects the induced voltage based on the reference load unit during the third detection period without detecting the induced voltage based on the reference load unit during the second detection period, the control unit determines the position as the reference position.

5. The timepiece movement according to claim 2, wherein the control unit detects the rotation state of the rotor throughout the one round period during which the indicating hand is rotated at least one round, wherein in a case where a load fluctuation applied by the reference load unit is not identified during the one round period, or in a case where the load fluctuation applied by the reference load unit is discontinuously identified twice or more times, the control unit detects the rotation state of the rotor again throughout the one round period without changing energy of the detection drive pulse, and wherein in a case where the load fluctuation applied by the reference load unit is identified only once during the one round period, the control unit determines a position where the fluctuation is identified, as the reference position.

6. The timepiece movement according to claim 2, herein the control unit is capable of controlling a case where an indicating hand operation is performed using the detection drive pulse when a first rotation state is detected, and a case where the indicating hand operation is performed by adding the auxiliary drive pulse after the indicating hand operation is performed using the detection drive pulse when a second rotation state is detected, wherein in a case where the second rotation state is detected, the control unit determines the reference position by identifying the load fluctuation applied by the reference load unit, and wherein in a case where the load fluctuation applied by the reference load unit is identified only once in the one round period during which the indicating hand is rotated at least one round, the control unit determines a position where the fluctuation is identified, as the reference position.

7. The timepiece movement according to claim 2, wherein in a case where the load fluctuation applied by the reference load unit is continuously detected at least twice in the one round period during which the indicating hand is rotated at least one round, the control unit determines the reference position, based on first time detection.

8. The timepiece movement according to claim 2, wherein in a case where the load fluctuation applied by the reference load unit is continuously detected at least twice in the one round period during which the indicating hand is rotated at least one round, the control unit determines a position having a greatest load fluctuation, as the reference position.

9. The timepiece movement according to claim 2, wherein the control unit stores the detection drive pulse used when the reference position is determined, as an optimal pulse.

10. The timepiece movement according to claim 9, wherein the control unit controls the stepping motor so that the indicating hand is operated using the optimal pulse.

11. A timepiece comprising:

the timepiece movement according to claim 1.

12. A reference position determination method of an indicating hand of a timepiece including a stepping motor having a rotor for rotating the indicating hand, and a control unit for rotating the rotor by using a main drive pulse and an auxiliary drive pulse, the method comprising:

a step of causing the control unit to determine a reference position of the indicating hand by detecting a rotation state of the rotor, when the rotor is rotated using a detection drive pulse based on the main drive pulse.

* * * * *